3,077,389
PREPARATION OF AQUEOUS POTASSIUM
SILICATE SOLUTIONS
William A. Schulze and David B. Speed, Cleveland, Ohio, assignors to E. I. du Pont de Nemours and Company, Wilmington, Del., a corporation of Delaware
No Drawing. Filed Jan. 8, 1960, Ser. No. 1,165
3 Claims. (Cl. 23—312)

This invention relates to the production of aqueous potassium silicate solutions. More particularly it relates to a process which obviates the need for expensive refrigerating conditions in the preparation of aqueous potassium silicate solutions which are particularly effective in improving the wet adherence of phosphor coatings.

According to the present invention, a significant and unobvious improvement in the rewet adherence characteristics of potassium silicate solutions is obtained. Rewet adherence is a measure of how strongly the phosphor is held to the glass when it is rewet for the lacquering operation which is used in aluminizing of tubes. More will be said about this hereinafter.

Aqueous potassium silicate solutions are known to be useful in the settling of phosphor particles from a liquid medium as surface coatings in the manufacture of luminescent screens, such as screens in cathode-day tubes and the like which can be used for television. Such potassium silicate solutions are generally made by dissolving electronics grade potassium silicate glass in water. This dissolution is effectively accomplished at elevated temperatures and in some cases at above-atmospheric pressures in a suitable vessel, such as an autoclave, although less drastic conditions are also satisfactory. The prepared solution is then filtered and, if desired, adjusted with respect to concentration and $SiO_2:K_2O$ weight ratio, as well as optionally given one or more other treatments, as will be understood in the art. The resulting solution is then cooled and ready for packaging, storage, shipment or immediate use.

We have observed that the aqueous potassium silicate solution produced as described above is sensitive with respect to at least one property if prolonged standing occurs at elevated temperatures, particularly temperatures on the order of 60° to 90° C. Although there are no apparent changes in the composition of the potassium silicate solution upon exposure to such elevated temperatures, we have observed that exposure to such temperatures causes a deleterious effect on the wet adhesion properties, such as increasing the rate and the extent at which wet adherence degradation occurs, of such solutions which are subsequently utilized in the settling of luminescent particles onto glass surfaces.

Aqueous potassium silicate solutions are commercially produced conveniently in large quantities, in batches on the order of 1,000 gallons each. After dissolution of the electronics grade potassium silicate glass in water, therefore, the cooling of the prepared solutions to room temperature for packaging, storage, shipment or use becomes a problem of considerable magnitude.

One way in which the prepared aqueous potassium silicate solution in such a large quantity can be brought to room temperature, without requiring that the solution be within the injurious temperature range for a time sufficient to harm the wet adhesion characteristics of the heat sensitive solution, is to artifically cool the solution. This can be done by means of expensive refrigeration equipment, which is both complex and uneconomical.

We have discovered that surprisingly outstanding advantages are obtained by cooling the prepared aqueous potassium silicate solutions to room temperature at a rate of cooling not in excess of 10° F. per hour, and more preferably from 2° to 5° F. per hour. Furthermore, the wet adhesion characteristics of such heat sensitive solutions will not be deleteriously affected to an objectionable extent by heat during the slow cooling as just recited, if the preparation of the potassium silicate solutions is carried out by dissolving the electronics grade potassium silicate glass for a time and at a temperature and pressure sufficient for dissolution in water having a specific conductivity of less than the reciprocal of about 50,000 ohms at 18° C.

Also, unexpectedly, the practice of the present invention effects a remarkable improvement in rewet adherence quality, as mentioned above. This is particularly important because we have found no predictable relationship between wet adherence and rewet adherence. And it is only recently that the television industry has been stressing a need for improving the rewet adherence quality of silicate solutions. Improvement of as great as 118% have been demonstrated in comparative tests on rewet adherence using solutions prepared by the process of the present invention compared with solutions prepared from water of identical purity but with the prepared solution cooled at a rate slightly outside that of the claimed process of this invention.

The invention can be restated as the novel process of preparing an aqueous potassium silicate solution adapted for use as a suspending and cementing agent for phosphors in making television picture tubes, the steps comprising dissolving electronics grade potassium silicate glass at a temperature within the range from 120° to 330° F., and preferably from 212° to 285° F., and at a pressure within the range from atmospheric to 105 p.s.i. absolute, and preferably from atmospheric to 55 p.s.i. absolute, in water having a specific conductivity of less than the reciprocal of about 50,000 ohms, and cooling the resultant solution at a rate not in excess of 10° F. per hour, and more preferably from 2° to 5° F. per hour, until the temperature of the solution has reached that of the ambient atmosphere.

The reason for the improvements occasioned by the process of this invention is not fully understood, although they may be caused, at least in part, by a significant reduction in the heat sensitivity of the solution during the particular cooling conditions according to this invention. It may be that a sort of shield against heat degradation is established by the particular necessary process conditions. We do not wish to be bound by any one explanation of the theory of operation of our invention, however, since, as stated before, the theory is not presently clearly understood.

If desired, as will be understood in the art, the $SiO_2:K_2O$ weight ratio of the prepared aqueous potassium silicate solution can be adjusted, either in the pressure dissolving vessel or in the cooling tank, to a preselected final weight ratio. This adjustment can be made, for example, by adding potassium hydroxide to the prepared solution. The potassium hydroxide can be added in any form, such as flake caustic potash or preferably in aqueous solution. The preferred final weight ratio of $SiO_2:K_2O$ is within the range from 1.95:1 to 2.25:1, and more particularly it is preferred that the final weight ratio be about 2.00:1 to 2.07:1.

As stated above, the aqueous potassium silicate solutions prepared according to the process of this invention are useful in the formation of a uniform and adherent coating of phosphor particles, by settling from the potassium silicate liquid medium, in preparing luminescent screens in cathode-ray tubes which are use for television.

It can be observed that the use of silicate solutions produced according to this invention exhibit more consistent and uniform adhesion properties than prior art solutions.

It has also been noted that aqueous potassium silicate solutions prepared according to this invention are more stable to wet adherence degradation caused by passage of time, and temperatures from room to about 90° C. than solutions prepared by prior art processes.

The phosphor, or mixture of phosphors, as will be understood in the art, is preferably suspended in the aqueous potassium silicate solution. The suspension or slurry is poured into a television tube or envelope and is allowed to settle on the base of the tube. It is, of course, desirable that the phosphor form a uniform and adherent coating which will remain relatively unimpaired when the liquid is removed and the coating is dried in the course of further processing.

The potassium silicate solution can be added to the tube after an aqueous solution of a suitable salt has already been introduced. There may be in the tube, prior to the addition of the potassium silicate and phosphor, an aqueous solution of a suitable electrolyte, e.g., barium acetate, acetic acid, potassium acetate, and the like, to assist in gel formation. The phosphor can be added at different times and so can the salt.

The settling process for forming phosphor coatings is old in the art and the specific phosphor used and the specific salts and other additives constitute, per se, no part of the present invention. Further details of suitable such processes and materials will be found in the Journal of the Electrochemicals Society, vol. 99, No. 4, page 164, in an article entitled "Liquid Settled Luminescent Screens," by Pakswer and Intiso. Reference can also be had to the Journal of the Electrochemicals Society, vol. 95, page 112 (1949), in an article by Sadowski entitled "The Preparation of Luminescent Screens." It will be understood that the present invention is directed to a novel process for obtaining aqueous potassium silicate solutions of improved characteristics.

The aqueous potassium silicate solutions prepared according to this invention can be of any desired concentration. In accordance with customary practice, the concentration will ordinarily be high to avoid unnecessary handling of large quantities of water. Such solutions as supplied commercially conveniently can contain about 29% to 40% of potassium silicate by weight. Of course, the solutions can be more dilute, e.g., 0.3% to 5% or even less, and conveniently at the concentrations at which they are used in the settling process, say, about 0.8% of potassium silicate solids by weight. Any desired concentration can be supplied with the consumer doing the final adjustment to use concentration.

The phosphors settled in the aqueous potassium silicate solutions produced as described above can be any of those used in the art. There can be employed, for example, zinc sulfide, cadmium sulfide, zinc cadmium sulfide, and other commercially available phosphors. These phosphors can be activated with any of the usual activating metals, e.g., manganese, silver, copper and mixtures thereof.

In measuring the improvement made possible by the process of this invention, the wet adhesion or wet strength of the deposited layer of phosphor particles can be measured by subjecting the deposited layer to the action of a submerged hydraulic jet. This method is well known to those versed in the art of television tube manufacture, and is described in a paper by D. J. Bracco and W. R. Watkins presented before the Electrochemicals Society at Detroit, Michigan, on October 12, 1951. According to this testing method, the size of the spot produced by the jet is in inverse relation to the adhesion of the phosphor to the glass. Using these testing methods, comparison of the wet adhesion properties of the aqueous potassium silicate solution prepared according to the present invention with those prepared according to the prior art show an improvement in the wet adherence of as much as 20 to 50% or higher when utilizing the solutions prepared according to the present invention.

The water used to dissolve the potassium silicate glass in the process of this invention can be purchased ready to use or, if desired, can be conveniently prepared within the required limit of specific conductivity by any suitable means, e.g., ion exchange treatment, distillation, etc.

In order that the invention may be better understood, reference can be had to the following illustrative example:

*Example 1*

In a rotary steel 210 cubic feet capacity dissolver (autoclave), mounted for operation at 8 revolutions per minute and heated by direct use of steam charged into the dissolver, a charge was made of approximately 4,000 pounds of electronics grade potassium silicate high purity glass having a $SiO_2:K_2O$ ratio of about 2.50, and 1,000 gallons of water having a specific conductivity of less than the reciprocal of about 50,000 ohms. Dissolution of glass in the water took place to a gravity of 30–33° Bé. measured at 60° F., at a dissolving pressure of about 55 pounds per square inch absolute and a dissolving temperature of about 285° F. Steam was sparged directly into the dissolver (autoclave) as required to maintain the dissolving conditions. The solution was then discharged from the dissolver into a holding tank where the $SiO_2:K_2O$ ratio was adjusted with potassium hydroxide to about 2.07. In this tank the gravity was also adjusted to about 30.50° Bé. at 60° F. The resultant solution in this tank was cooled to room temperature at a rate of about 2° F. per hour.

Two hunded and fifty milliliters of the above aqueous potassium silicate solution were diluted with 350 milliliters of demineralized water. To the resulting 600 milliliters of dilute solution, there was added 8 grams of du Pont phosphor 24 L.V. 7, a commercial blended zinc cadmium sulfide phosphor. The phosphor-silicate slurry was then mixed for 5 minutes. The slurry was then introduced into a 21″ television picture tube containing, as a water cushion, 14 liters of barium acetate solution having a concentration of 0.04% of barium acetate by weight. The phosphor was allowed to settle for 15 minutes to form a uniform film having excellent wet adherence characteristics on the base of the television tube. The aqueous system was thereafter removed from the tube and the coating dried, after which the tube was ready for further assembly. The adhered phosphor film exhibited outstanding rewet adherence properties when rewet for a subsequent lacquering operation.

This application is a continuation-in-part of our copending application Serial No. 714,489, filed February 11, 1958, now abandoned.

We claim:

1. The process of preparing a batch of an aqueous potassium silicate solution comprising dissolving at a temperature within the range of 120 to 330° F. and a pressure within the range of atmospheric to 105 p.s.i. absolute electronics grade potassium silicate glass in water having a specific conductivity of less than the reciprocal of about 50,000 ohms at 18° C. and cooling the resulting solution to room temperature at a rate not in excess of about 10° F. per hour.

2. The process of preparing an aqueous potassium silicate solution particularly adapted for use in the settling of phosphor particles onto glass surfaces, the steps comprising combining at a temperature within the range of 212 to 285° F. and a pressure within the range of atmospheric to 55 p.s.i. absolute electronics grade potassium silicate glass and water having a specific conductivity of less than the reciprocal of about 50,000 ohms at 18° C. under conditions sufficient to effect dissolution of said glass in said water to form a solution, and cooling said last-mentioned solution to room temperature at a rate not in excess of 10° F. per hour.

3. The process as set forth in claim 2 wherein said cooling rate is from 2 to 5° F. per hour.

References Cited in the file of this patent

UNITED STATES PATENTS 2,784,060     Santmyers _____ Mar. 5, 1957

OTHER REFERENCES

Hackh's Chem. Dictionary, 3rd ed., The Blakiston Co., Philadelphia, Pa., 1944, pages 220 and 903.